C. A. KRUGH & J. A. HENDRICKS.
STEERING DEVICE FOR TRACTORS.
APPLICATION FILED DEC. 19, 1916.

1,227,455.

Patented May 22, 1917.

Witnesses:

Inventors,
C. A. Krugh,
J. A. Hendricks.

UNITED STATES PATENT OFFICE.

CHARLES A. KRUGH, OF MONROE, AND JIM. A. HENDRICKS, OF DECATUR, INDIANA.

STEERING DEVICE FOR TRACTORS.

1,227,455.     Specification of Letters Patent.     Patented May 22, 1917.

Application filed December 19, 1916. Serial No. 137,784.

*To all whom it may concern:*

Be it known that we, (1) CHARLES A. KRUGH and (2) JIM. A. HENDRICKS, citizens of the United States, residing at (1) Monroe and (2) Decatur, in the county of Adams and State of Indiana, have invented certain new and useful Improvements in Steering Devices for Tractors; and we do hereby declare the following to be a full, clear, and exact description of the invention, such as will enable others skilled in the art to which it appertains to make and use the same.

This invention relates to a steering structure for use upon traction engines, and which is particularly adapted for use in connection with the usual type of worm shaft and chain structures employed for steering the front wheels of steam traction engines.

An object of this invention is to provide an auxiliary steering post upon which the steering wheel is mounted, to form gear teeth about the inner surface of the steering wheel which mesh with a pinion carried by the usual steering post, whereby the speed of rotation of the hand steering wheel will be multiplied when transmitted to the steering post.

With the foregoing and other objects in view, this invention consists in such novel features of construction, combination and arrangement of parts as will be hereinafter more fully described, illustrated in the accompanying drawing and claimed.

In describing the invention in detail, reference will be had to the accompanying drawing wherein like characters designate like and corresponding parts throughout the several views, and in which:—

Figure 1:
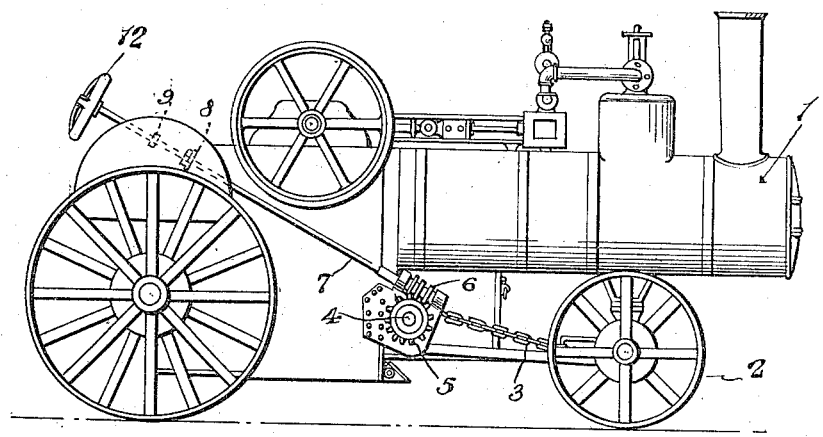
Figure 1 is a side elevation of an ordinary tractor showing the steering device applied thereto.
Figure 2:
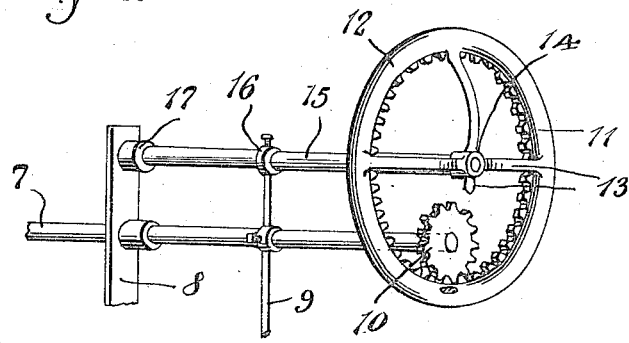
Fig. 2 is a detail view illustrating the attachment to the steering structure of the tractor.
Figure 3:
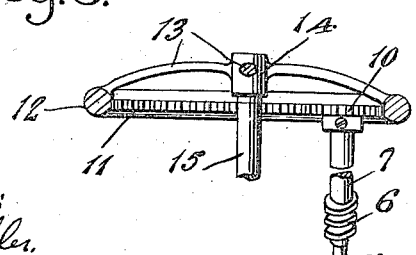
Fig. 3 is a section through Fig. 2.

Referring more particularly to the drawing, 1 designates an ordinary steam tractor or traction engine, which has the usual type of front steering wheels 2. The wheels 2 are steered in the usual manner through the medium of chains 3, a shaft 4 and a worm gear 5 which is mounted upon the end of the shaft and meshes with a worm 6 carried by the lower forward end of the steering post 7. The steering post 7, is supported by suitable bearings 8 and 9, which may extend upwardly from the platform of the tractor, and it has a pinion 10 mounted upon its rear end which pinion meshes with the teeth 11 formed about the inner surface of the hand steering wheel 12. The hand steering wheel 12 is of the usual construction, with the exception of the teeth 11, having a plurality of ribs or spokes 13 and a hub 14, which hub is mounted upon an auxiliary steering post 15. The auxiliary steering post 15 is rotatably supported by bearings 16 and 17 which are carried by the brackets 8 and 9. The bearing 17 is preferably a thrust bearing, and supports the end of the auxiliary steering post 15.

When the hand wheel 12 is rotated, it will, through the meshing engagement of the teeth 11 with the teeth of the pinion 10 rotate the steering post 7, at a greater rate of speed than the rotation of the steering post 15, depending upon the ratio of the diameter of the hand wheel 12 and the pinion 10, thereby decreasing the amount of manual labor contingent with the steering of the front wheels of the traction engine, and also enabling an engineer to steer or change the direction of travel of the engine much quicker than by the ordinary means of rotating the steering post directly by the rotation of the hand wheel.

In reducing the invention to practice, certain minor features of construction, combination and arrangement of parts may necessitate alterations to which the patentee is entitled provided such alterations are comprehended within the scope of what is claimed.

What is claimed is:—

1. In a steering structure, the combination of a steering post, a pinion mounted upon one end of said steering post, an auxiliary steering post, a hand wheel carried by said auxiliary steering post, gear teeth formed about the inner surface of said hand wheel and meshing with said pinion for rotating said steering post at a greater rate of speed than the rotation of said auxiliary steering post upon rotation of said hand wheel.

2. In a steering structure, the combination of a steering post, an auxiliary steering post, a hand wheel carried by said auxiliary steering post, and means for rotating said steering post by the rotation of said hand wheel at a greater rate of speed than the rotation of said auxiliary steering post.

In testimony whereof we affix our signatures in presence of two witnesses.

CHARLES A. KRUGH.
JIM. A. HENDRICKS.

Witnesses:
 JOHN C. MORAN,
 DICK BOCH.

Copies of this patent may be obtained for five cents each, by addressing the "Commissioner of Patents, Washington, D. C."